United States Patent
Hogg et al.

(10) Patent No.: US 12,394,801 B2
(45) Date of Patent: Aug. 19, 2025

(54) COLLECTOR FOIL AND METHOD FOR PRODUCING A COLLECTOR FOIL

(71) Applicant: Bayerische Motoren Werke Aktiengesellschaft, Munich (DE)

(72) Inventors: Bjoern-Ingo Hieronymus Hogg, Munich (DE); Katja Tenhaeff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 856 days.

(21) Appl. No.: 17/417,540

(22) PCT Filed: Dec. 10, 2019

(86) PCT No.: PCT/EP2019/084351
§ 371 (c)(1),
(2) Date: Jun. 23, 2021

(87) PCT Pub. No.: WO2020/143971
PCT Pub. Date: Jul. 16, 2020

(65) Prior Publication Data
US 2022/0059847 A1    Feb. 24, 2022

(30) Foreign Application Priority Data
Jan. 10, 2019    (DE) ............ 10 2019 100 476.4

(51) Int. Cl.
*H01M 4/70*    (2006.01)
*H01M 4/04*    (2006.01)
*H01M 4/66*    (2006.01)
*H01M 10/0525*    (2010.01)

(52) U.S. Cl.
CPC ............ *H01M 4/70* (2013.01); *H01M 4/0435* (2013.01); *H01M 4/667* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2006/0204837 A1* | 9/2006 | Kaito | H01M 4/667 |
| | | | 429/231.95 |
| 2011/0039138 A1 | 2/2011 | Jeong et al. | |
| 2012/0288749 A1 | 11/2012 | Kim | |

(Continued)

FOREIGN PATENT DOCUMENTS

| | | |
|---|---|---|
| CN | 101997108 A | 3/2011 |
| CN | 102780006 A | 11/2012 |

(Continued)

OTHER PUBLICATIONS

English translation of Chinese Office Action issued in Chinese Application No. 201980075848.1 dated Apr. 26, 2023 (10 pages).

(Continued)

*Primary Examiner* — Alix E Eggerding
(74) *Attorney, Agent, or Firm* — Crowell & Moring LLP

(57) ABSTRACT

A collector foil includes a base material which has at least one coating region on one side or on either side, and an uncoated region of the base material has at least one stretching region which is designed to mechanically decouple the at least one coating region from the uncoated region.

15 Claims, 2 Drawing Sheets

(56) References Cited

U.S. PATENT DOCUMENTS

| | | |
|---|---|---|
| 2012/0288756 A1 | 11/2012 | Kim |
| 2013/0216879 A1* | 8/2013 | Egawa ................ H01M 10/052 |
| | | 429/94 |
| 2014/0069690 A1 | 3/2014 | Diez et al. |
| 2018/0337392 A1 | 11/2018 | Lee et al. |
| 2020/0203712 A1* | 6/2020 | Park .................... H01M 4/0409 |

FOREIGN PATENT DOCUMENTS

| | | |
|---|---|---|
| CN | 103563128 A | 2/2014 |
| CN | 108028359 A | 5/2018 |
| DE | 10 2011 088 824 A1 | 6/2013 |
| DE | 10 2013 207 353 A1 | 10/2014 |
| DE | 10 2018 200 543 A1 | 7/2019 |
| DE | 10 2018 203 033 A1 | 9/2019 |
| EP | 2 296 209 A1 | 3/2011 |
| EP | 3 333 941 A1 | 6/2018 |
| JP | 02-174058 * | 7/1990 |

OTHER PUBLICATIONS

International Search Report (PCT/ISA/210) issued in PCT Application No. PCT/EP2019/084351 dated Mar. 6, 2020 with English translation (four (4) pages).

German-language Written Opinion (PCT/ISA/237) issued in PCT Application No. PCT/EP2019/084351 dated Mar. 6, 2020 (six (6) pages).

German-language Search Report issued in German Application No. 10 2019 100 476.4 dated Oct. 11, 2019 with an English translation (13 pages).

English translation of Chinese-language Office Action issued in Chinese Application No. 201980075848.1 dated Feb. 1, 2024 (9 pages).

Li, J., "Technology of Daily Ceramics", Wuhan University Technology Press, Jul. 31, 1992, p. 130 (3 pages).

* cited by examiner

COLLECTOR FOIL AND METHOD FOR PRODUCING A COLLECTOR FOIL

BACKGROUND AND SUMMARY OF THE INVENTION

The present invention relates to a collector foil, in particular for lithium-ion accumulators, to a method for producing a collector foil, and to a battery cell.

Irrespective of the cell type, the smallest unit of a lithium-ion cell including two electrodes and a separator, which separates the electrodes from one another. Situated in between is the ion-conductive electrolyte. The electrodes are formed by foils coated with an active material. During calendering, the coated carrier foil is compacted by one or more rotating roller pairs. In this process, it is possible, for example, to set a porosity of the coating. In this respect, however, there is often the problem that unwanted deformations of the foil occur. In particular in the uncoated regions of the carrier foil, the introduction of force creates e.g. kinks or distortions, etc., which lead to a loss of quality and inter alia also make further processing of the foils more difficult. Owing to the existing damage, cracks and the like can thus form in downstream process steps, for example when cutting the foils to size. It is also the case that weldability by use of lasers is possibly made more difficult, since focusing cannot be performed correctly. In order to counteract these problems, EP 2 296 209 A1 proposes heating the non-coated regions of the carrier foil. From a process technology perspective, however, this is complex and moreover difficult to control. Moreover, it is not guaranteed that the aforementioned problems can be avoided effectively.

It is therefore an object of the present invention to specify a collector foil, a method for producing a collector foil, and a battery cell which eliminate the aforementioned problems in a simple and effective way.

This object is achieved by the claimed invention.

According to embodiments of the invention, a collector foil, in particular for lithium-ion accumulators, comprises a base material, which has at least one coating region on one or both sides, and wherein an uncoated region of the base material comprises at least one expanding region, which is designed to mechanically decouple the at least one coating region from the uncoated region. The base material is in particular a carrier foil. Depending on whether the collector foil is a collector foil for the anode or for the cathode, the material of the carrier foil is selected correspondingly. In the case of the anode, the carrier foil is typically a copper foil; in the case of the cathode, the carrier foil is typically an aluminum foil. Preferred foil thicknesses vary depending on the cell design, for example between approximately 6 µm and 25 µm. The aluminum foil is preferably rolled. The copper foil is preferably rolled or produced by electrolysis. The base material or the carrier foil is coated with the respective active material. This is performed, for example, using suitable application tools, such as slotted nozzles, doctor blades, engraved rollers, etc. In this respect, the coating may be performed either continuously or intermittently as seen in a sheet direction of the carrier foil. As an alternative, the base material or the carrier foil may also be a plastic foil which is coated in a suitable way, for example with a metal. According to one embodiment, the collector foil has one or more continuous or intermittent coating strips with uncoated regions that lie in between or on the outside. In particular in the case of an electrode design having one or more continuous or intermittent coating strips and one, two or more blank metal strips or uncoated regions, intense deformations of the base material occur. This is exhibited, e.g., in the formation of folds, in particular in the uncoated edge or center strips, in warping of the base material in the coated region, in a difference in the length of the base material between coated and uncoated regions or the formation of a "banana shape" after a cutting operation of the base material in the sheet direction. This leads to processing problems during winding in the calender or subsequent process steps: e.g. the formation of folds and cracks in the roller cutting process, focusing problems during laser notching, winding problems during the production of jelly rolls owing to the banana shape, etc. Since the collector foil is coated only in certain regions, it exhibits a strongly differing mechanical behavior, which leads to the problems described above specifically when a force is introduced. The expanding region thus advantageously allows the mechanical decoupling. The expanding region preferably has an elasticity or flexibility which is set or selected in such a way that, when a force is introduced, the expanding region deforms or can deform both elastically and plastically before the other regions of the base material or the carrier foil. As a consequence, the base material retains its original shape when a force is introduced, while the base material deforms in a targeted manner only in the expanding region. In particular, the expanding region thus provides an equalization or a equalizing function which brings about the mechanical decoupling of the coated region(s) from the remainder of the base material. A compressive force which is introduced e.g. into a coating region consequently advantageously does not lead to any unwanted deformations in the uncoated regions, or vice versa.

The expanding region is advantageously designed to allow a change in base-material length that is targeted or in certain regions, or an equalization of the base-material length in certain regions, and/or an adaptation of the base-material length in certain regions. The at least one expanding region is advantageously provided in particular in the transition region from the uncoated region of the base material to the coated region. In particular, the expanding region serves to relieve load or to reduce stress between the lengthened coating regions and the uncoated regions that are not lengthened or are lengthened to a lesser extent.

According to a preferred embodiment, the change in length or the adaptation of the length and/or the equalization of the length is achieved by a change in shape of the expanding region in certain regions, or in that the expanding region is designed to carry out or provide a change in shape. The base material in the expanding region is advantageously shaped or processed such that this change in shape is made possible.

According to a preferred embodiment, the expanding region comprises at least one material aperture or material weakening. The change in length and/or the equalization of the length or the mechanical decoupling is preferably brought about or made possible by a material weakening and/or separation, in certain regions, of the base material in the expanding region, and/or by a breakdown, in certain regions, of the material cohesion of the base material in the expanding region. The breakdown, at least in certain regions, of the material cohesion allows a realignment, at least in certain regions, of the base material in the expanding region when a force is introduced.

According to a preferred embodiment, the base material in the expanding region has at least one slit or cut. According to one embodiment, the at least one slit or cut is in the form of a straight line, a zigzag, an arrow and/or an arc. Alternative shapes not mentioned here are also conceivable. The properties or the actual geometry of the cuts depend(s) on the individual case and in particular on the desired deformation behavior which is to be achieved. A targeted alignment and/or geometry of the slits or cuts, for example, expediently makes it possible to predefine a change-in-length direction. As an alternative or in addition, apertures such as holes, for example round or polygonal, may also be provided. According to one embodiment, the base material in the expanding region is also suitably perforated or has predetermined breaking points.

According to a preferred embodiment, the expanding region has an expanded-metal-like structure. In addition to the aforementioned slits or cuts, the expanded-metal-like structure comprises a multiplicity of webs or tabs which are shaped thereby and are optionally distorted or twisted at least in certain regions depending on the introduction of force. The expanded-metal-like structure can also be understood to mean a pattern of cuts that is designed to shape or form an expanded-metal-like structure, in particular during a corresponding introduction of force.

The at least one expanding region expediently comprises a multiplicity of slits or cuts which are oriented in and/or transverse to the first direction. According to one embodiment, the cuts or slits are also oriented differently, for example some in a first direction, others transversely thereto, yet others obliquely, etc. The cuts or slits may also be oriented randomly and in an unaligned manner. The actual configuration also depends on the properties of the base material and an optimal solution has to be ascertained as appropriate in the individual case or by tests.

According to a preferred embodiment, the at least one expanding region is formed only in the uncoated region of the base material. Any openings or pores in the region of the coating or below the coating could lead to an inhomogeneous coating thickness or even density of the coating, which has an adverse effect on the service life of the battery cell.

According to one embodiment, the expanding region is in the form of an edge or strip which runs at least partially, preferably completely, around the periphery of the at least one coating region. In this respect, the width of this edge or strip may lie in the range of a few millimeters, for example 2-5 mm, up to a few centimeters, for example 1-2 cm. However, it also applies here that the actual configuration in particular depends on the other geometric relationships and in particular also on the size of the collector foil. Also, it is not necessary for the edge or strip to have a uniform width.

According to a preferred embodiment, the base material in the uncoated region is not completely formed as an expanding region. This is advantageous in particular for further processing. Regions in which the carrier foil is cut are advantageously not formed as an expanding region. The same applies for regions in which the carrier foil is welded, for example to a conductor.

According to one embodiment, the expanding region is in the form of a strip, or a multiplicity of strip-like expanding regions are provided. These may run in or parallel to, but also obliquely or transversely to, a sheet direction of the base material or of the carrier foil.

According to one embodiment, the base material extends in a sheet direction and has a strip-like coating region, in particular approximately in the center, wherein expanding regions, in particular strip-like expanding regions, are formed in the transition from the coating region to the uncoated edge regions.

According to one embodiment, the base material extends in a sheet direction and has a multiplicity of coating regions arranged in the sheet direction, wherein expanding regions run around the periphery of the coating regions at least in certain regions or completely.

According to one embodiment, a multiplicity of expanding regions are provided, which are in the form of strips and run transversely or substantially transversely to the sheet direction. In this case, the expanding regions are advantageously spaced apart from one another to the same extent. As an alternative, however, the spacings between the expanding regions may also vary. According to one embodiment, the expanding regions extend over an entire width of the carrier foil or of the base material, the regions below the coating expediently being excluded.

According to one embodiment, provided between the or one expanding region and/or also the expanding region formed on the periphery as an edge and/or the expanding regions and the respective coating region is a spacing, for example in a range of approximately 0.5 to 5 mm, in particular in a range of approximately 1 to 3 mm. The expanding region in this case does not directly adjoin the respective coating region. This may be expedient from a process technology perspective.

An embodiment of the invention is also directed at a method for producing a collector foil, comprising introducing, at least in certain regions, an expanding region into a base material of a collector foil or for a collector foil, wherein the expanding region is designed to mechanically decouple a coating region of the base material from an uncoated region of the base material.

It should be pointed out at this juncture that the advantages and features mentioned in connection with the collector foil apply analogously and correspondingly to the method, and vice versa.

According to one embodiment, the method comprises introducing the expanding region into the base material before, during or after a coating of the base material. Advantageously, the formation of the expanding region can thus be integrated into the production process in a very flexible manner.

According to one embodiment, the method comprises introducing the expanding region when calendering is taking place, during the calendering and/or after the calendering.

Calendering in particular involves the compaction of the collector foil, in particular of the coating regions, these coating regions inter alia being set to a defined extent. For example, in this process step, a porosity of the coating regions can also be set. The expanding region(s) may also be introduced in a separate process step. In principle, any deformations which have already been produced, for example during the calendering, may also be removed again or reversed by the subsequent introduction of one or more expanding regions. According to one embodiment, the base material has a plurality of coating regions, for example two coating regions, which are next to one another and spaced apart from one another and extend in a sheet or longitudinal direction of the base material or of the carrier foil. It is possible to produce e.g. a plurality of collector foils, in particular two collector foils, from a base material of this type. As an alternative or in addition, the base material is intermittently coated.

According to one embodiment, the method comprises pre-lengthening the expanding region before the calendering.

The expanding region should be understood in particular to mean a region or portion of the base material which allows a change in shape and consequently an adaptation of the length or an equalization of the length, etc. According to one embodiment, the expanding region comprises one or more cuts or slits, expressed differently also as a "pattern of cuts", which makes the abovementioned properties possible. According to a preferred embodiment, the expanding region is in the form of an expanded-metal-like structure. Since the expanding region has the pattern of cuts, this structure may be produced at least partially during the calendering. As an alternative, the base material may be pre-lengthened before the calendering already in such a way that the expanded-metal-like structure is already at least partially formed.

According to one embodiment, the method comprises using one or more offset rollers and/or an expander roller and/or profiled guiding rolls during the processing of the collector foil, in particular when the calendering is being carried out.

The formation of the expanded-metal-like structure may be assisted optionally by the guidance of the material in the installation after introducing the pattern of cuts or the cuts, slits, etc. Possible assistance may be effected e.g. by an expander roller or profiled guiding rolls. A profiling of the guiding rolls makes it possible to increase an introduction of force into the blank, uncoated foil region. As a result, the formation of an excessively great difference in the lengthening of the uncoated region and the coated region can advantageously be avoided, since the introduction of force and the associated deformation are distributed more homogeneously and/or more uniformly over the width of the entire carrier foil (over the coated and the uncoated regions). A further advantage is that the geometric formation of the expansion pattern can be controlled, in addition to control over the setting of the sheet tension and of the compaction parameters. In addition, a heating in certain regions, for example by induction, of the base material may also be performed, in particular in the uncoated edge zones or edge regions, in order to reduce the formation of folds and/or formation of cracks, etc. An offset roller advantageously comprises different diameters. A roller of this type preferably comprises two external guiding rolls having a first diameter and a roller portion formed in between having a second diameter, wherein the second diameter is smaller than the first. In this way, the introduction of force into the uncoated edge regions can be optimized.

According to various embodiments, rotary dies, stamps having a vertical lifting movement or laser cutting processes, for example, are used for producing, creating or forming the expanding region.

An embodiment of the invention is also directed at a battery cell comprising one, or at least one, collector foil according to the invention. This battery cell is preferably a prismatic battery cell, in particular a lithium-ion battery cell, which is used in a battery or an accumulator of a traction battery of a hybrid or electric vehicle. As an alternative, it is also possible for this battery cell to be a round cell or a pouch cell or flat cell, in particular also for smaller electronic devices, such as smartphones, laptops, cameras, etc.

Further advantages and features will emerge from the following description of embodiments of collector foils in relation to the appended figures. In this respect, various features can be combined with one another in the context of the invention.

DETAILED DESCRIPTION OF THE DRAWINGS

Figure 1:
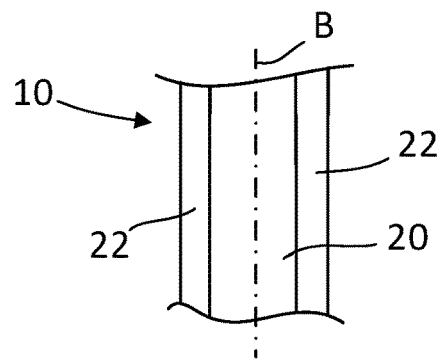
FIG. 1 shows a plan view of part of a collector foil in a schematic illustration.

FIG. 1 shows a plan view of a detail of a collector foil, comprising a base material 10 which extends in a longitudinal or sheet direction B. The base material 10 comprises an uncoated region 22 and a strip-like coating region 20, which is coated with the corresponding active material. The composition of this active material depends on whether the collector foil is for the anode or the cathode.

Figure 2:
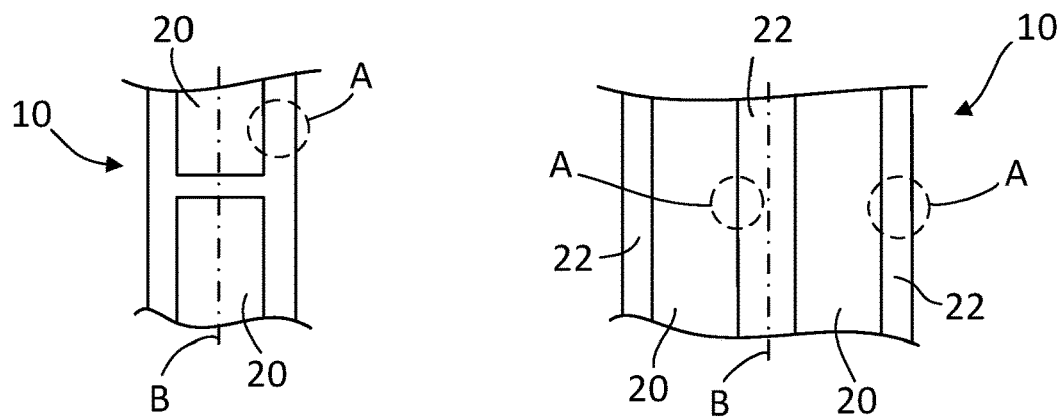
FIG. 2 shows two further configurations of collector foils.

FIG. 2 shows two further typical shapes of collector foils 10 with correspondingly formed coating regions 20. In the left half of FIG. 2, the coating regions 20 are applied intermittently. Outlined in the right half of FIG. 2 is a configuration which has two strip-like coating regions 20 next to one another. A base material 10 of this type is cut, for example in the center. The reference sign A outlines views of a detail which are illustrated in an enlarged manner in FIG. 3. The expanding regions formed there can be seen in particular in FIG. 3.

Figure 3:
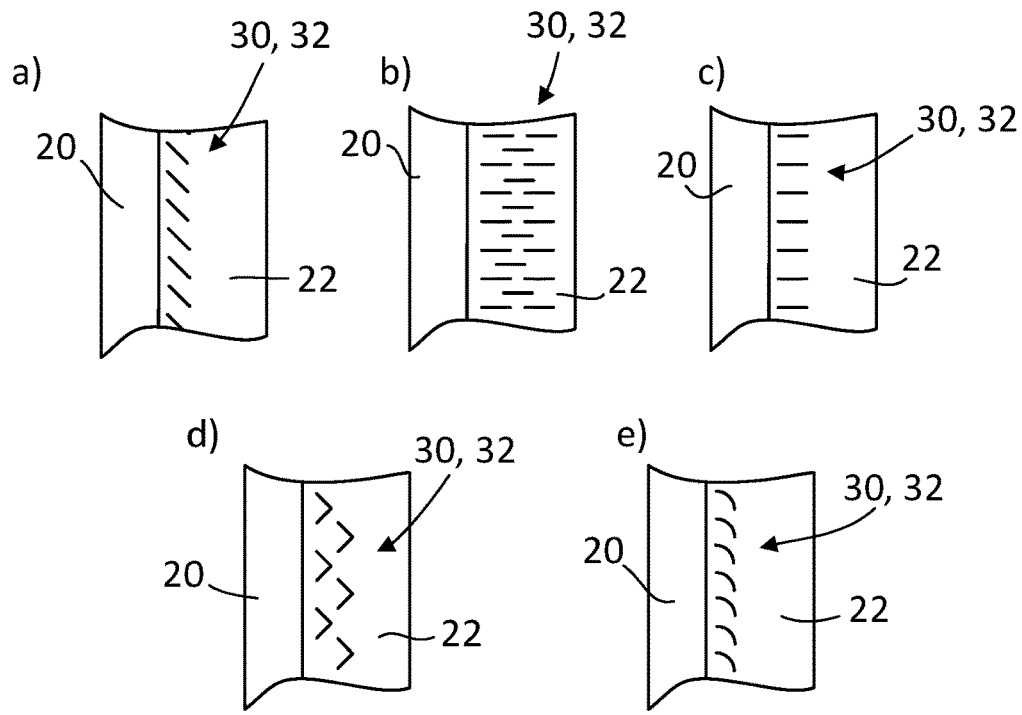
FIG. 3 shows several details or views of a detail of collector foils for the purpose of illustrating different configurations of expanding regions.

FIG. 3 shows, in an example a), an expanding region 30 comprising a multiplicity of cuts 32 which run obliquely in relation to a sheet direction, cf. also FIG. 2. It can also be seen that, in the embodiment shown there, the expanding region 30 is formed exclusively in a transition region between the coating region 20 and the uncoated region 22. By contrast, in the variant shown at b), the expanding region 30 extends over the entire uncoated region 22, that is to say here as far as the edge of the base material 10, cf. also FIG. 2. The cuts 32 here are in the form of cuts running transversely to the sheet direction B or to the first direction R. Any functional regions, for example regions in which welding operations are carried out on the collector foil, advantageously do not have an expanding region. The variants shown under c), d) and e) show further possible embodiments of expanding regions, different patterns of cuts being shown.

Figure 4:
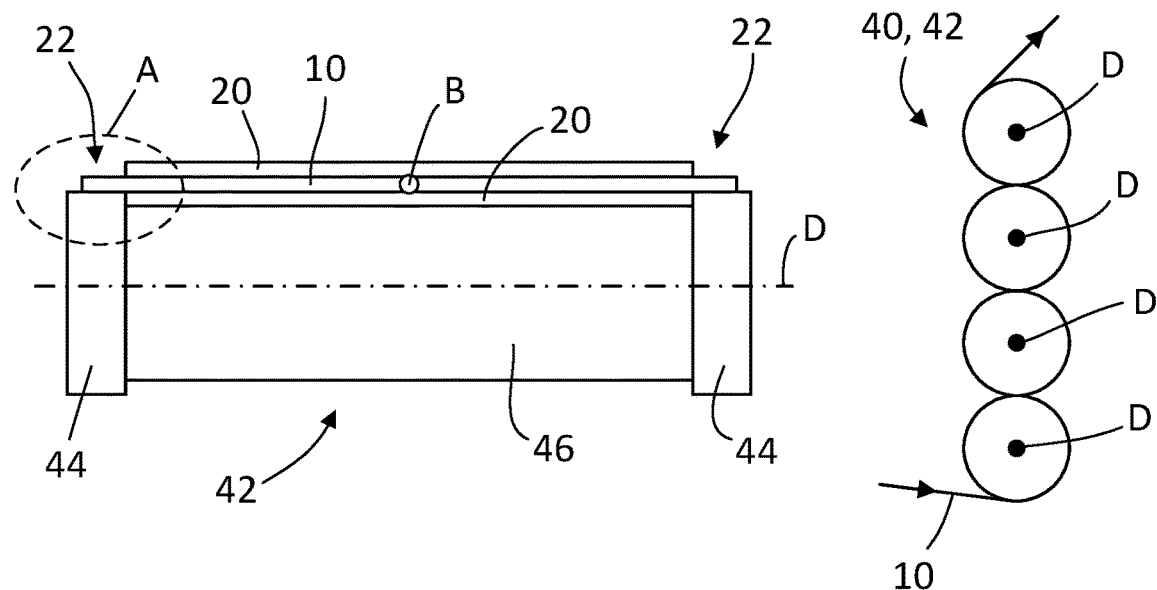
FIG. 4 shows a schematic view of a roller and of a length-equalizing unit.

FIG. 4 shows a very schematic illustration of a roller 42 comprising a center roll and/or a center roller portion 46 having a second diameter, and also external guiding rolls 44 having first diameters, the first diameters being larger than the second diameters. In particular, the two diameters are adapted to a geometry of the collector foil. In this case, the guiding rolls 44 bear against the uncoated regions 22 of the base material 10, whereas the center roll 46 bears against the coating region 20. In the present case, the view is selected such that a sheet direction B or a first direction R runs perpendicularly into the plane of the drawing. The reference sign D outlines an axis of rotation of the roller 42. Schematically illustrated in the right half of the image is a length-equalizing unit 40 comprising a multiplicity of rollers 42 of this type, which may be a constituent part of a calendering installation and assists the expanding process. The passage of a base material 10 through the length-equalizing unit 40 is illustrated schematically. Reference sign A denotes a view of a detail, variants to this effect being pointed out in FIG. 5.

Figure 5:
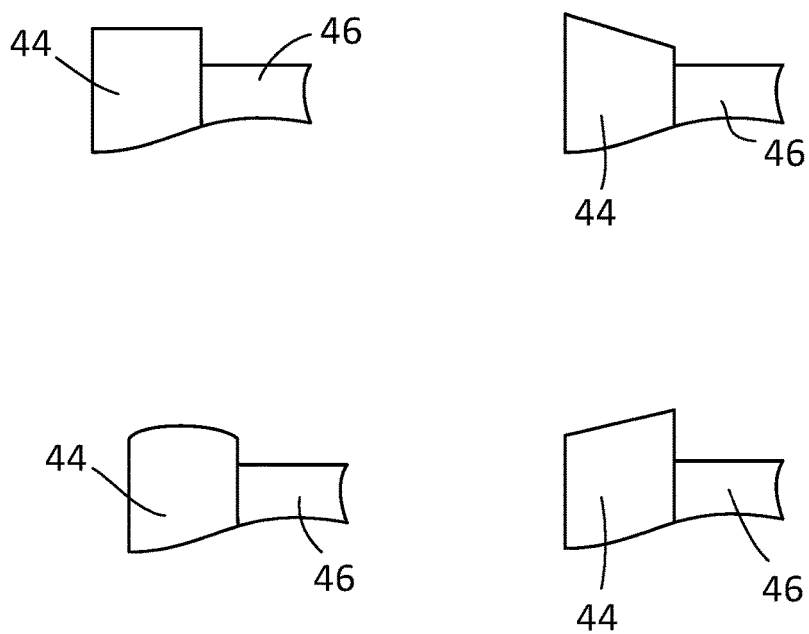
FIG. 5 shows various views of a detail of guiding rolls, as outlined in FIG. 4.

FIG. 5 shows several possible configurations of guiding rolls 44, reference being made to FIG. 4 in respect of their position and/or function. It can be seen that the guiding rolls 44 may have different outer circumferential surfaces or profiles. The outer circumferential surface may, for example, be formed straight, inclined or oblique or else convex or generally round. This makes it possible to achieve an introduction of force into the uncoated region(s) of the foil.

List Of Reference Signs

10 Base material, carrier foil
20 Coating region
22 Uncoated region
30 Expanding region
32 Cut, slit
40 Length-equalizing unit
42 Roller
44 Guiding roll
46 Center roller portion
B Sheet direction
D Axis of rotation
A Detail

What is claimed is:

1. A collector foil comprising:
a base material comprising at least one coating region on at least one side of the base material, wherein:
an uncoated region of the base material comprises at least one expanding region that is configured to mechanically decouple the at least one coating region from the uncoated region,
the expanding region is formed in a transition region between the at least one coating region and the uncoated region,
the expanding region is in a form of an edge or a strip which runs around an entire periphery of the at least one coating region,
the base material in the expanding region has at least one slit or cut, and
the at least one slit or cut is oriented in a non-parallel direction with respect to a longitudinal sheet direction.

2. The collector foil according to claim 1, wherein the expanding region comprises at least one material aperture or at least one material weakening.

3. The collector foil according to claim 1, wherein the at least one slit or cut is in a form of a straight line, a zigzag, an arrow or an arc.

4. The collector foil according to claim 1, wherein the expanding region has an expanded-metal-like structure.

5. The collector foil according to claim 1, wherein the expanding region is formed only in the uncoated region.

6. The collector foil according to claim 1, wherein the base material in the uncoated region is not completely formed as an expanding region.

7. The collector foil according to claim 1, wherein:
the base material extends in the sheet direction, and
the at least one coating region comprises a strip-like coating region.

8. The collector foil according to claim 1, wherein:
the base material extends in the sheet direction,
the at least one coating region comprises a plurality of coating regions arranged in the sheet direction, and
expanding regions are arranged around a periphery of at least some of the coating regions.

9. A battery cell comprising a collector foil according to claim 1.

10. A method for producing a collector foil, the method comprising:
introducing an expanding region into at least a part of a base material of a collector foil, wherein:
the expanding region is configured to mechanically decouple a coating region of the base material from an uncoated region of the base material,
the expanding region is formed in a transition region between the at least one coating region and the uncoated region,
the expanding region is in a form of an edge or a strip which runs around an entire periphery of the at least one coating region,
the base material in the expanding region has at least one slit or cut, and
the at least one slit or cut is oriented in a non-parallel direction with respect to a longitudinal sheet direction.

11. The method according to claim 10, wherein the expanding region is introduced into the base material before, during or after a coating of the base material.

12. The method according to claim 10, wherein the expanding region is introduced when calendering of the collector foil is being performed.

13. The method according to claim 12, further comprising:
pre-lengthening the expanding region before the calendering of the collector foil is performed.

14. The method according to claim 12, further comprising:
using at least one of one or more offset rollers, an expander roller, or profiled guiding rolls during processing of the collector foil.

15. The method according to claim 14, wherein the processing comprises the calendaring.

* * * * *